United States Patent
Franklin et al.

(10) Patent No.: US 6,510,491 B1
(45) Date of Patent: Jan. 21, 2003

(54) SYSTEM AND METHOD FOR ACCOMPLISHING DATA STORAGE MIGRATION BETWEEN RAID LEVELS

(75) Inventors: Chris R. Franklin, Merrimack, NH (US); Randy M. Arnott, Mont Vernon, NH (US); Jeffrey T. Wong, Newton, MA (US)

(73) Assignee: Adaptec, Inc., Miliptas, CA (US)

( * ) Notice: Subject to any disclaimer, the term of this patent is extended or adjusted under 35 U.S.C. 154(b) by 0 days.

(21) Appl. No.: 09/465,057

(22) Filed: Dec. 16, 1999

(51) Int. Cl.⁷ .............................................. G06F 13/10
(52) U.S. Cl. ...................................................... 711/114
(58) Field of Search ......................................... 711/114

(56) References Cited

U.S. PATENT DOCUMENTS

| | | | |
|---|---|---|---|
| 5,263,154 A | 11/1993 | Eastridge et al. | 395/575 |
| 5,568,629 A | 10/1996 | Gentry et al. | 395/441 |
| 5,675,769 A | 10/1997 | Ruff et al. | 395/497.04 |
| 5,721,858 A | 2/1998 | White et al. | 395/413 |
| 5,794,254 A | 8/1998 | McClain | 707/204 |
| 5,835,953 A | 11/1998 | Ohran | 711/162 |
| 5,875,457 A * | 2/1999 | Shalit | 711/114 |
| 5,907,672 A | 5/1999 | Matze et al. | 395/182.06 |
| 5,930,831 A | 7/1999 | March et al. | 711/173 |
| 6,275,898 B1 * | 8/2001 | De Koning | 711/114 |
| 6,282,619 B1 * | 8/2001 | Islam et al. | 711/165 |
| 6,304,942 B1 * | 10/2001 | De Koning | 711/114 |

OTHER PUBLICATIONS

U.S. patent application Ser. No. 08/964,304, Napolitano et al., filed Nov. 4, 1997.

* cited by examiner

*Primary Examiner*—Kevin L. Ellis
(74) *Attorney, Agent, or Firm*—Cesari and McKenna, LLP

(57) ABSTRACT

A system and method for changing between various levels and configurations of redundant array of independent disk (RAID) implementations is provided. A specialized driver establishes a specialized "morph" container in a top level above primary and secondary level containers. The morph container communicates with the host computer I/O and arranges mapping of data between an original source container configuration and a new destination configuration. A morph container mapping structure is implemented to accomplish the mapping therebetween. Where data is migrated from an original container space back into an original space, a temporary container can be established to facilitate the transfer between the space.

10 Claims, 9 Drawing Sheets

SYSTEM AND METHOD FOR ACCOMPLISHING DATA STORAGE MIGRATION BETWEEN RAID LEVELS

FIELD OF THE INVENTION

The invention relates generally to the field of computer systems and more particularly to system that employ redundant array of independent disks (RAID) architecture.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The operating system (such as Windows NT® available from Microsoft, Corp. of Redmond, Wash.) forwards I/O requests to an I/O subsystem, which, in turn, converts the logical addresses is into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and redundant data is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the operating system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the I/O subsystem's container manager configures the containers and maintains the configuration tables in a container layer of the I/O subsystem. In accordance with a co-pending related U.S. patent application Ser. No. 08/964,304, entitled, *File Array Storage Architecture* by Richard Napolitano et al., the container layer of the I/O subsystem comprises a Device Switch Table, a Container Array, and a Partition Table. The teachings of this application are expressly incorporated herein by reference. The Device Switch table consists of entries; each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When a software process issues an I/O request, the operating system accepts I/O request and translates it into an I/O request bound for a particular device. The operating system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

In prior systems, the containers are configured during the initial computer setup and can not be reconfigured during I/O processing without corrupting currently processing I/O requests. As storage needs on a computer system change, the system administrators may need to reconfigure containers to add disks to them or remove disks from them, partition disks drives to form new containers, and/or increase the size of existing containers. If containers are reconfigured during I/O processing in the I/O subsystem, the reconfiguration may corrupt or erase the currently processing I/O requests. However, shutting down the system to reconfigure containers may be unacceptable for businesses that require high availability, i.e., twenty-four hours/seven days a week on-line activity.

One aspect of the system described herein is to provide a method of routing processing I/O requests in the I/O subsystem to a different container than previously pointed to by the operating system. On-line storage devices are configured from one or more disks into logical units of storage space referred to herein as "containers." Containers are created and maintained by a software entity called the "container manager." Each type of container on the system has an associated driver, which processes system requests on that type of container.

It is often desirable to move data from one RAID disk configuration to another. For example, where more disk space is needed, a user may be willing to sacrifice the added security of RAID 5 parity for the reduced data storage demands of a standard RAID 0 stripe set. Similarly, where more security is a concern, the user may wish to "migrate" the data from a RAID 0 to a RAID 5 configuration.

Likewise, there are operations in which it may be necessary to add or remove disk space, either virtually or physically. In such instances, data must migrate to a new container set. Likewise, the operation known as On-line Container Expansion (OCE) entails a reconfiguration of storage to create new containers. In others circumstances, it may be desirable to reorganized a particular set of data to either emphasize or de-emphasize the use of a certain physical drive.

Each of these circumstances involves data migration between containers. On common approach for performing migration is to employ a specialized driver, that operates in conjunction with the general RAID driver and adapter firmware. This driver enables the dynamic transfer of data between container spaces. However, these drivers may have certain disadvantages. They are very complex.

It is therefore an object of this invention to provide a more efficient system and method for data migration between container spaces. This technique should enable migration of data between a wide range of RAID levels, and should allow data to move readily into new physical space or into the same physical space in which it originally resided.

SUMMARY OF THE INVENTION

This invention overcomes the disadvantages of the prior art by providing a system and method for changing (migrating) data between various levels and configurations of RAID implementations. A specialized driver establishes a specialized "morph" container in a top level above primary and secondary level containers. The morph container communicates with the host computer I/O and arranges mapping of data between an original source container configuration and a new destination configuration. A morph container mapping structure is implemented to accomplish the mapping therebetween. Where data is migrated from an original container space back into an original space, a temporary container can be established to facilitate the transfer between the space.

The migration of data can be used to establish fewer or greater number of containers in the second structure than in the first structure—in the manner of an on-line container expansion (OCE) process. The drivers for the morph and other containers typically reside in the RAID driver, which can be implemented as hardware, software or a combination thereof.

BRIEF DESCRIPTION OF THE DRAWINGS

The foregoing and other objects and advantages of the invention should become more clear with reference to the following detailed description, as illustrated by the drawings, in which.

DETAILED DESCRIPTION OF AN ILLUSTRATIVE EMBODIMENT

Figure 1:
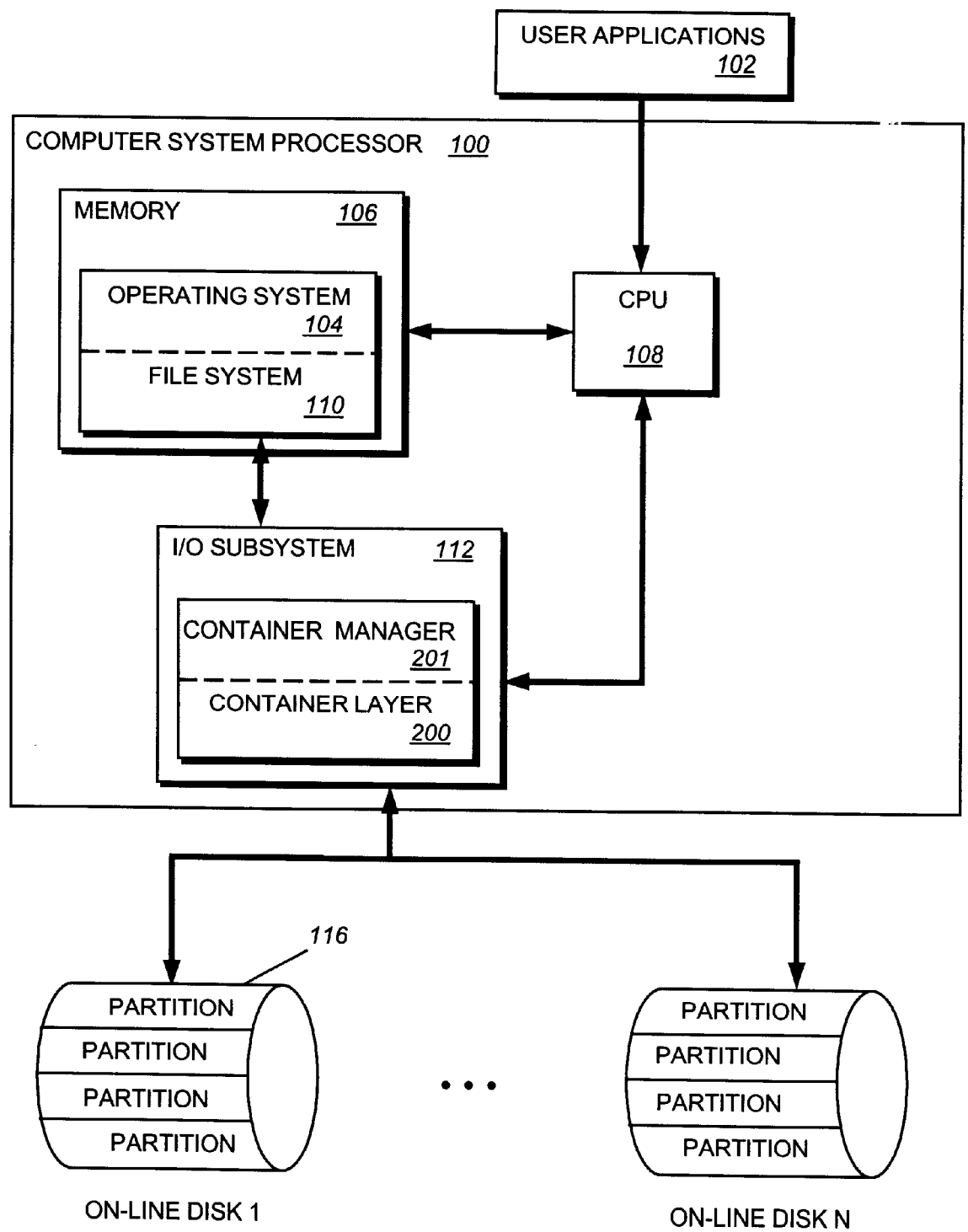
FIG. 1 is a block diagram of a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. User applications 102 are run by the host computer. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. A file system 110 may reside in the operating system 104, such as the NT File System (NTFS) from Microsoft. A file system is not required, and can be absent in certain circumstances. The I/O subsystem 112 is, in turn, connected to a set of on-line storage devices 116. These on-line storage devices 116 are partitioned into units of physical space.

The operating system 104 sends I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116 into containers and stores container configuration tables in the container layer 120 of the I/O subsystem 112. Container configuration enables the system administrator to partition a disk drive into one or more virtual disks. A container manager 118 operates in association with the I/O subsystem 112.

In a RAID configuration according to this invention, disk space is initially configured based upon a "firmware" application that comprises the RAID adapter. The application initializes each disk drive to include metadata, needed for operation of the disk and not directly manipulated by the host computer or user, and free space. Within the free space, containers may be created. This is typically accomplished by a user interface/utility that can be termed a "configuration wizard." This utility can prompt the user for types/levels of RAID to be established, and the size and number of containers, as well as other known parameters. To manipulate each container, a container driver is established by, and within, the adapter firmware. The container drivers map user I/O requests to and from containers. In this manner, the user and host do not communicate directly with the containers, but rather do so through the drivers via the host communication layer and associated bus (a PCI bus for example).

By isolating the container level from the host, the risk of data corruption and collisions between I/O requests is reduced substantially. To further reduce the risk, the host I/O driver only has information on so-called higher-level containers. For example, if there are defined containers 0–63, the host I/O driver may have information only on 0–23 (e.g. 0–23 are visible to the host), while 24–63 are "hidden" containers accessible only by the adapter and container drivers. Such hidden containers are employed (for example, to hide original containers) during the use of specialized containers—these specialized containers being established particularly for special procedures such as the snapshot backup operation, as known generally in the art. Other forms of data migration can be used to enable OCE processes and RAID level migration according to this invention.

Figure 2:
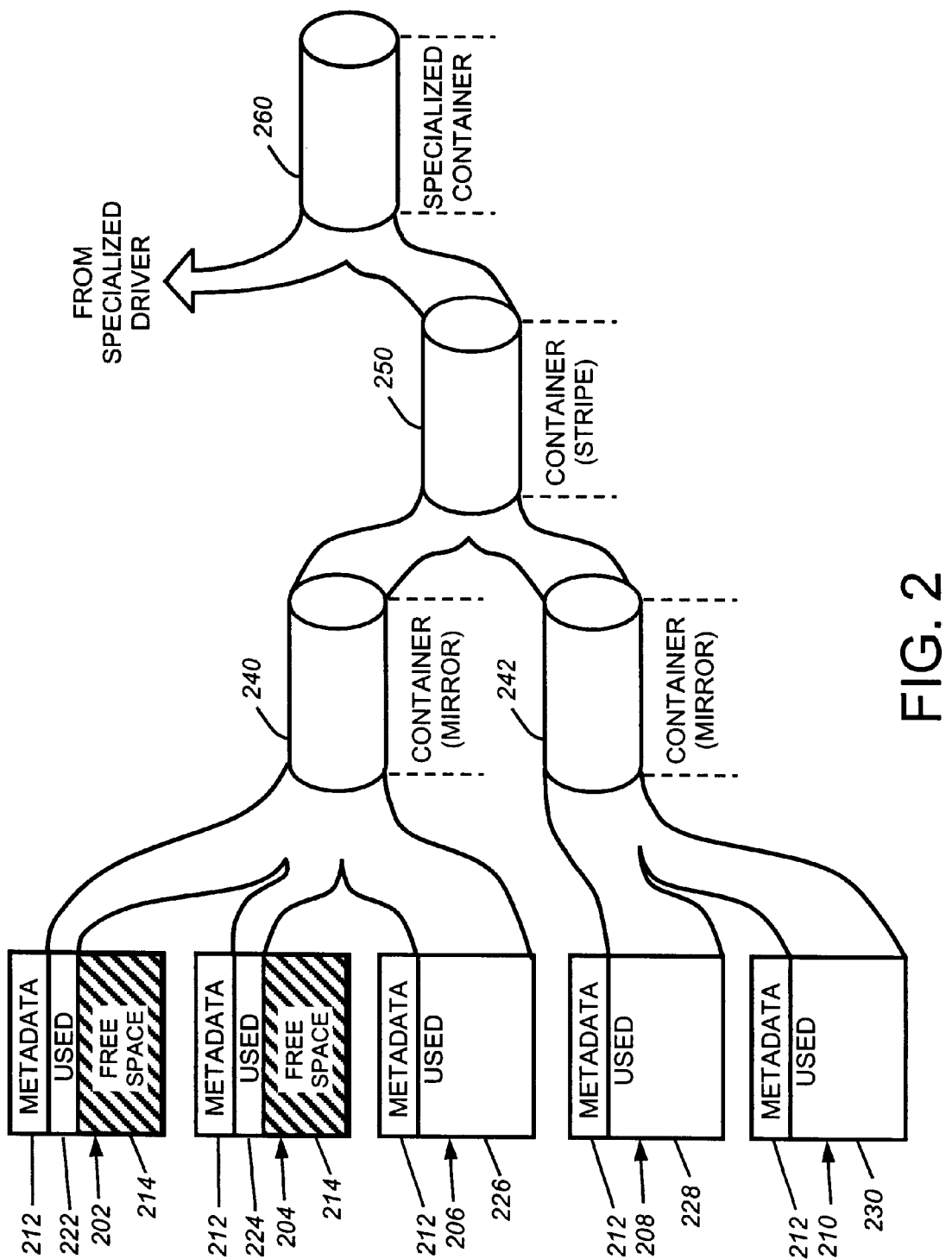
FIG. 2 is a schematic diagram of a container structure including a specialized container layer according to the principles of this invention.

With further reference to FIG. 2, an exemplary container level structure is shown. At the base of the structure are a series of disk drives 202, 204, 206, 208 and 210. Each of the disk drives includes a certain amount of metadata 212, as described above. Disks 202 and 204 include some amount of free disk space 214 that can be allocated for further data storage. Each disk 202, 204, 206, 208 and 210 includes a partitioned space that is used for current data storage (e.g. respective used space 222, 224, 226, 228 and 230).

The used space in the various disk drives is organized, as shown into a pair of containers 240 (grouping used space 222, 224, 226) and 242 (grouping used space 228 and 230). In this example, the two containers are controlled by drivers that generate mirror configurations therein for redundancy. This level can also be termed the "primary" container level. The two mirror containers are, likewise, grouped into a higher level of organization that defines a "stripe" container 250 with an associated stripe driver. This level is termed a "secondary" container level.

Primary and secondary levels are typically provided in a conventional RAID implementation, particularly where a RAID "stripe with mirrors" configuration is employed. However, it is contemplated, according to this invention that a tertiary container level be established above the primary and secondary levels. This higher-level container exists during the contemplated data migration process, and also during that time, becomes a higher level container visible to the host. This tertiary container is the higher-level specialized container 260, that forms over the secondary container 250 and also joins to specialized drivers as shown.

Figure 3:
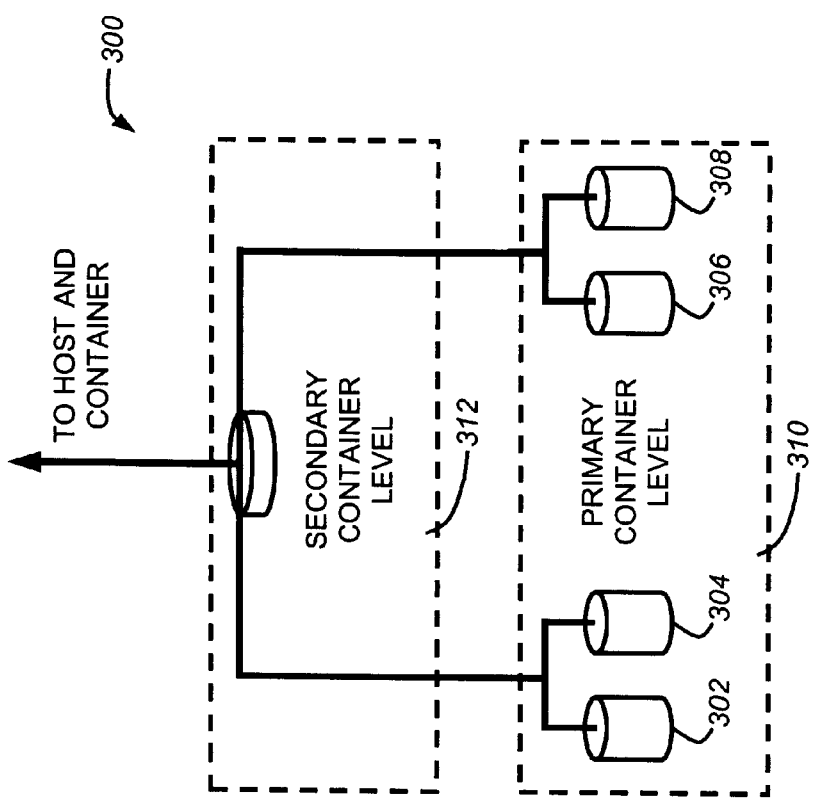
FIG. 3 is a block diagram of an exemplary RAID storage configuration before data migration according to an embodiment of this invention.

FIG. 3 shows a conventional, simplified configuration 300 of RAID disk containers 302, 304, 306 and 308 within a primary container level 310. These are organized within a secondary container level 312 that communicates with the host I/O drivers and other adapter controllers as described generally above.

Figure 4:
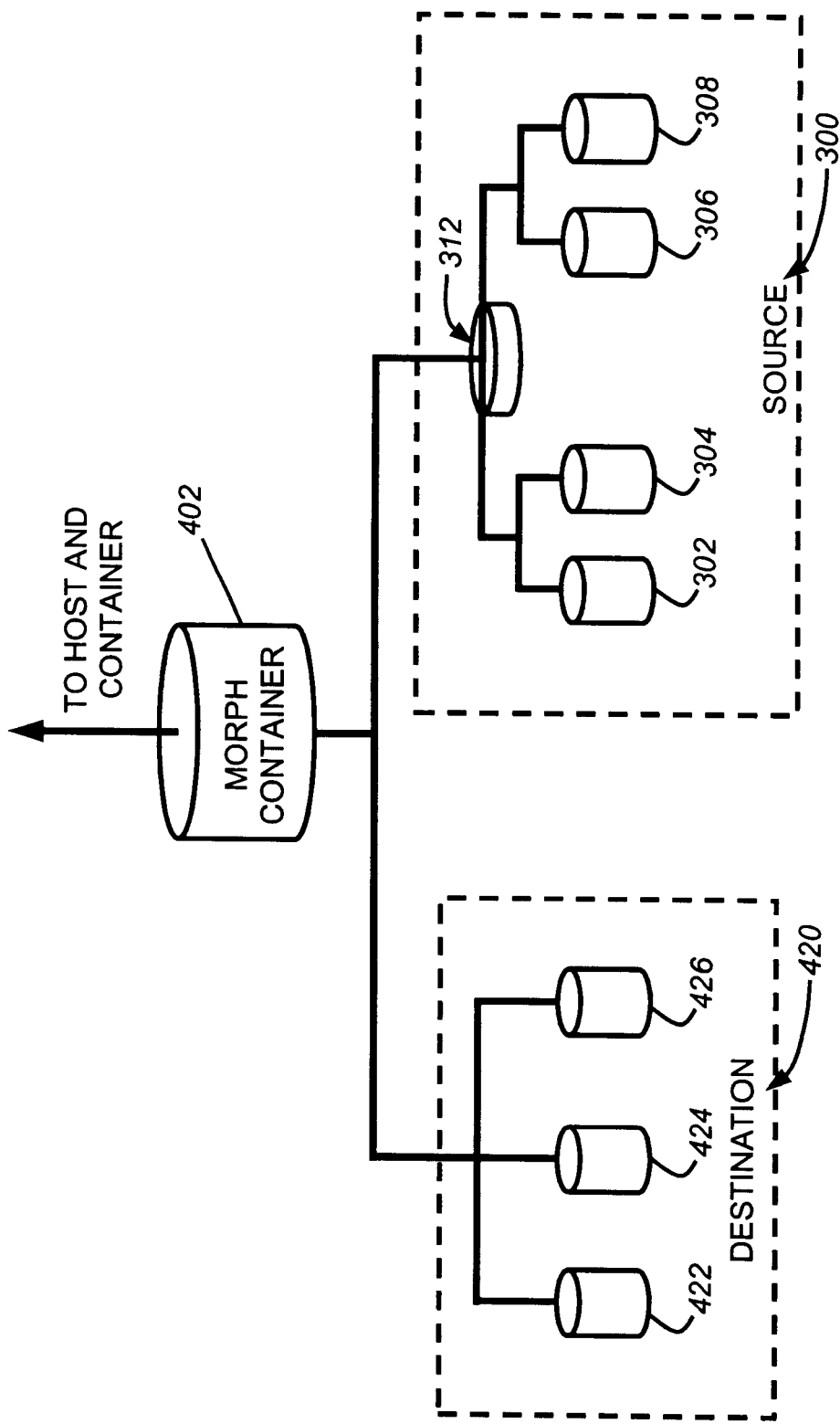
FIG. 4 is a block diagram of an exemplary RAID storage configuration after the creation of a specialized morph container and associated data migration therewith according to an embodiment of this invention.

Referring also to FIG. 4, a specialized container is formed by an associated specialized driver within the firmware. For the purposes of this description that container is termed the "morph" container 402, but any identifier can be used. Where the secondary container level 312 of the original configuration 300 was previously visible to the host for I/O purposes, the morph container 402 is now addressed as such. Under the morph container, the original configuration becomes known as the data source within the migration process to be described. The goal of the migration is to transfer the data from the source configuration to a new destination RAID configuration 420, which shows a different exemplary RAID organization. In this example there is a primary container level with three containers 422, 424 and 426.

Figure 5:
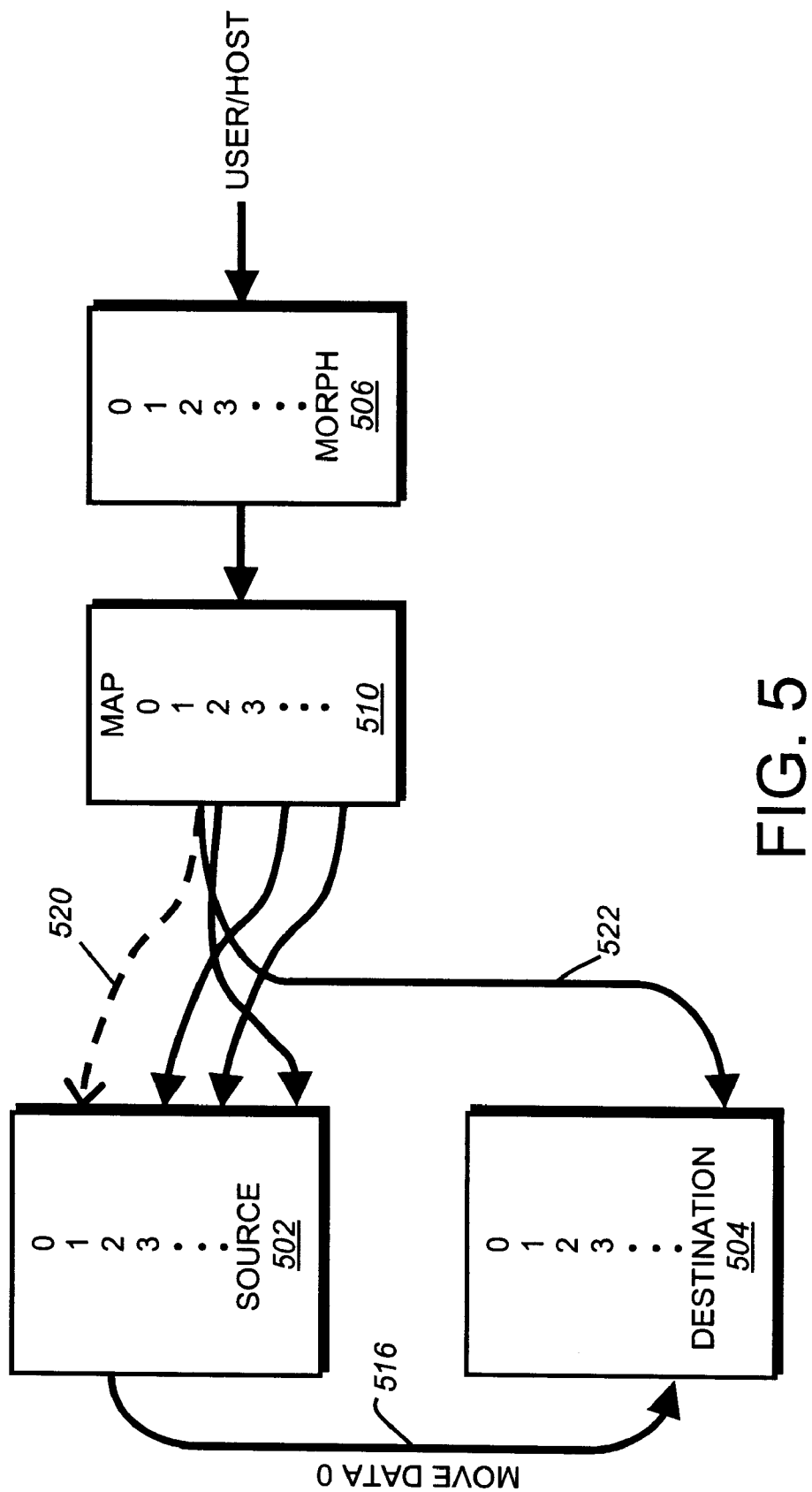
FIG. 5 is a block diagram showing the mapping of data migrating between source and destination containers during a data migration procedure in accordance with the configuration shown in FIG. 4.

Further reference is made to FIG. 5, which shows a block representation of the source container 502, a destination container 504, the morph container 506. Each denotes a series of storage blocks (e.g. 0, 1, 2 . . . ). The morph container, when established, takes the place of the source container as a visible I/O location. Accordingly, user/host I/O requests recognize the morph as the top-level container. The modified bit map (not shown) for mapping I/O, typically designates the morph with a high-level number such as "1" and makes the top level of the source (formerly "1" a hidden container during the migration process. A further mapping structure 510 controls the movement of data between containers. Data is moved from container to container. The mapping is typically a task controlled by the specialized RAID driver.

The mapping enables the morph container 506 to become the storage site of data from the source 502. The data is then moved by mapping to the destination container 504 via the morph container. In accordance with FIG. 5, the mapping of an exemplary DATA 0 is moved (line 516) from the source 502 (see dashed line 520 indicating a broken map) to the destination 404 (as indicated by a new map line 522).

Figure 6:
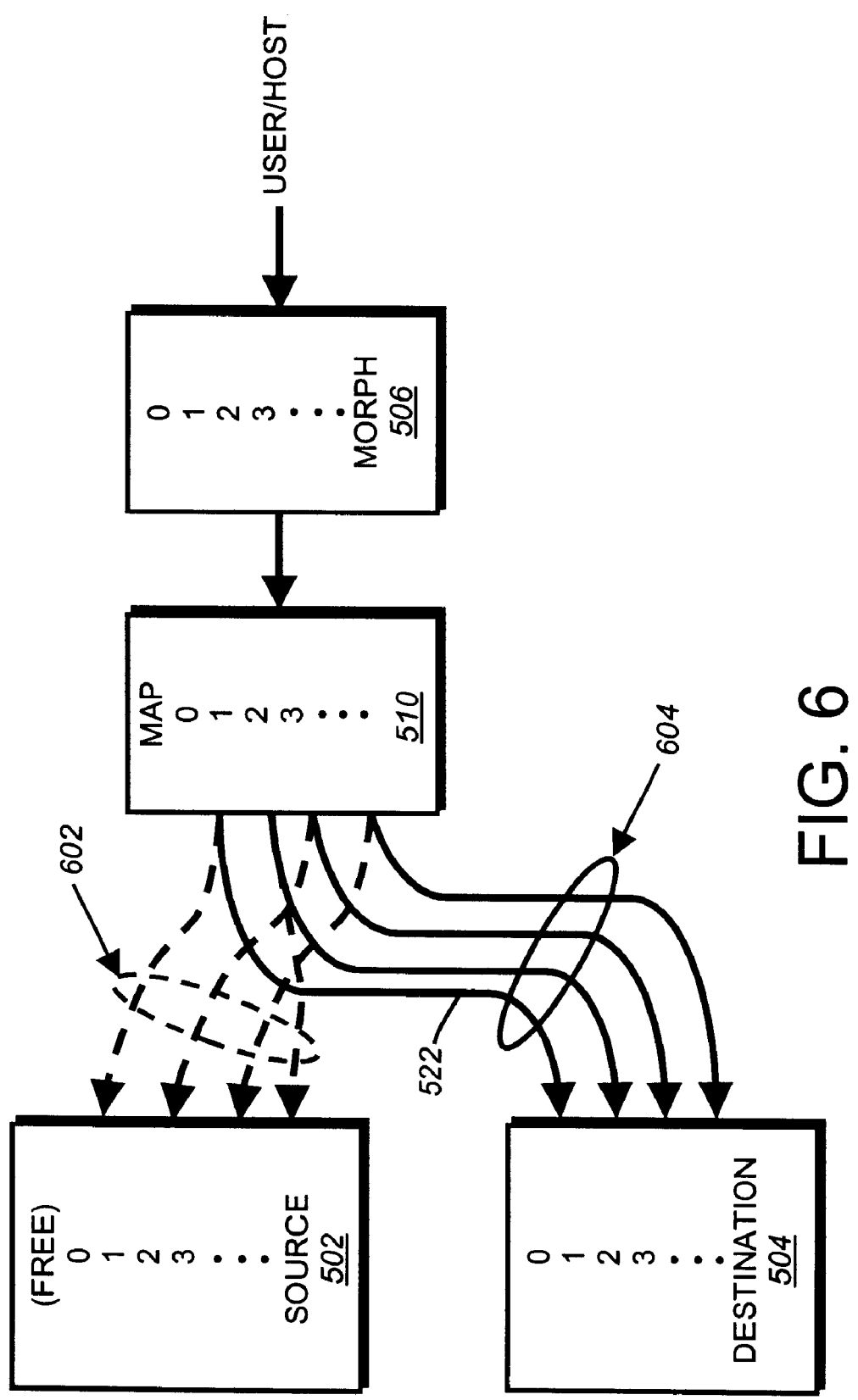
FIG. 6 is a block diagram showing the mapping of a completed data migration from the source to the destination container as begun in accordance with FIG. 5.

In FIG. 6, the movement of data is completed with all map lines 602 to the source container 502 being broken, while the new mapping of the data is made into the destination container 504 (in accordance with to map lines 604). The source container is now considered "free" and may be eliminated entirely as a space. As described above, the top-level container mapping (e.g. "1") is now passed to the destination container set. This is recognized as such for further I/O purposes. The morph container and the source container(s) are no longer recognized by the system.

An advantage of the migration system according to this invention is that the morph driver enables ready reconfiguration from any RAID implementation to any other implementation with relative ease, including the expansion of the storage into a greater number of containers, or contraction thereof into fewer containers.

Figure 7:
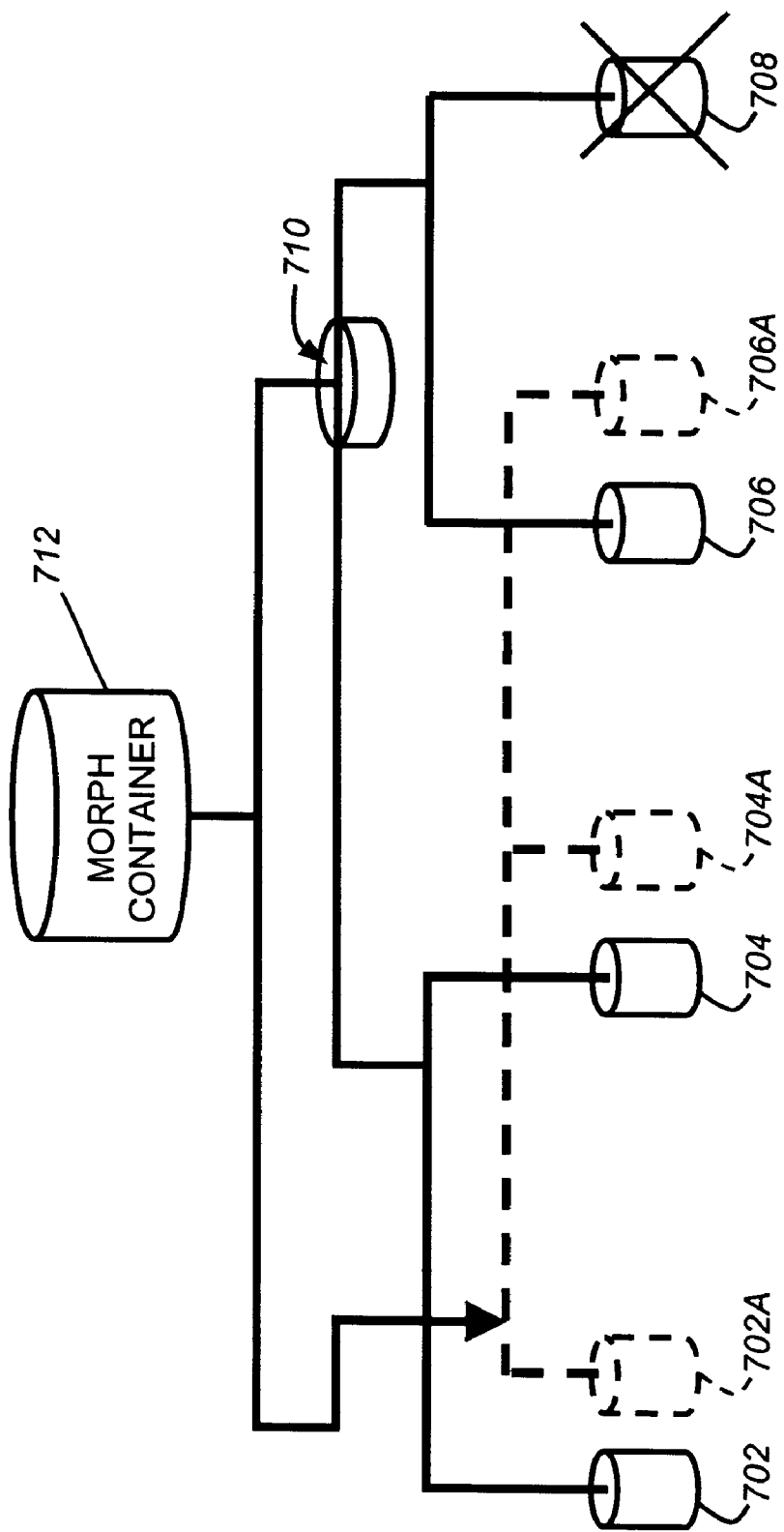
FIG. 7 is a block diagram of an exemplary RAID storage configuration showing the migration of data from one configuration of a given container space back into the same space with a new configuration.

There are instances in which the container space may be directly overwritten by the migrating data. In other words an implementation as shown generally in FIG. 7 may be desired, in which the data is "moved" back into essentially the same container space with a concomitant change in RAID level and removal of containers. In particular, original primary level container pairs 702, 704 and 706, 708 are organized under original secondary level container 710. The morph container 712 is established with associated driver above this container structure. The resulting migration of data (shown in dashed-line form) causes blocks to be moved into three of the same primary level containers (702A, 704A and 706A) while container 708 and the secondary level container 710 are eliminated. Since blocks are rewritten into the same container space, there may be conflicts and collisions between old and new data. The morph driver can be used to resolve any conflicts, and a further step within the mapping process is employed.

Figure 8:
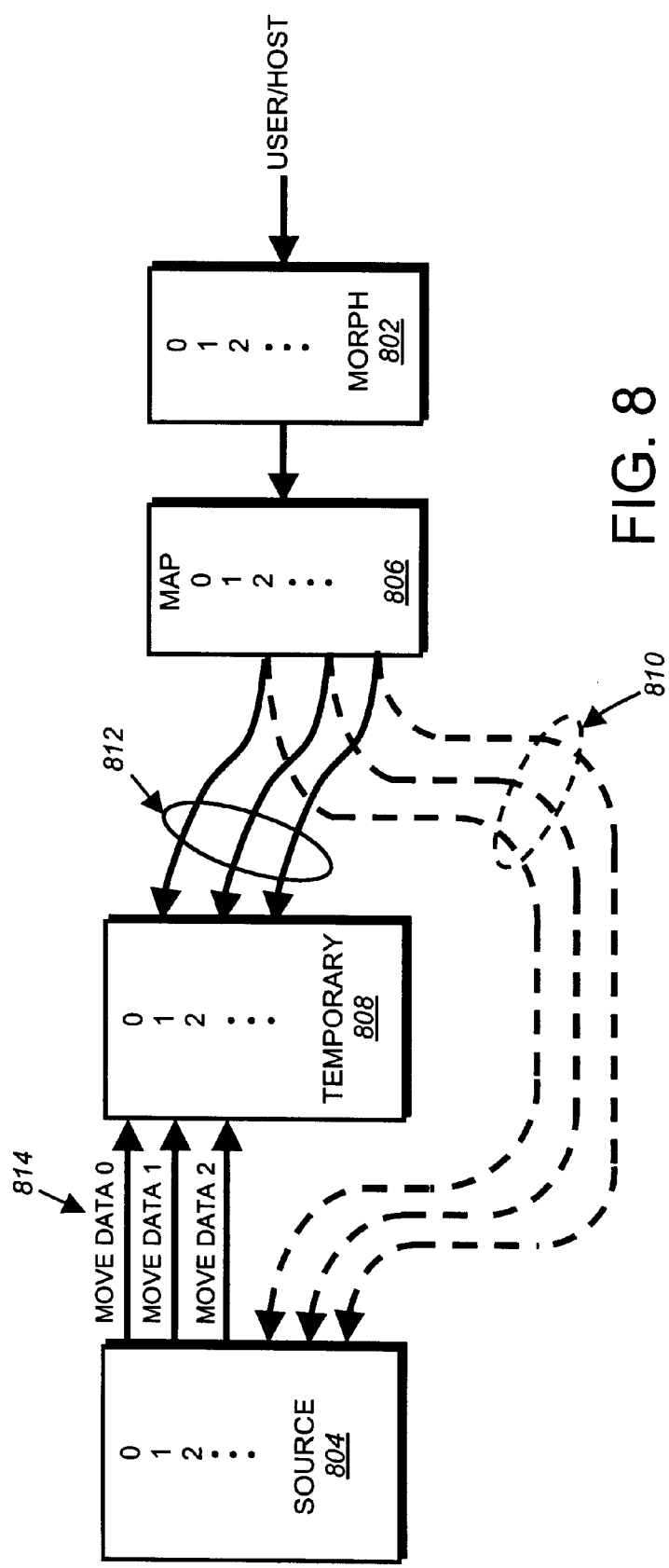
FIG. 8 is a block diagram showing the mapping of data migrating between a source container and a temporary container, during a data migration procedure in accordance with the configuration shown in FIG. 7.

Referring also to FIG. 8, the mapping process is shown. A morph container 802 is represented. Also shown is a source container 804, which corresponds with the original RAID implementation of FIG. 7. A map 806, constructed as a task, similar to that described above is also shown. In addition, there is provided a temporary container 808. The temporary container allows data to be mapped in the interim as it is moved from the source and back to the destination, which, in this example is the same space as the source. The temporary container can be established by the driver arrangement when it detects that destination addresses are the same as source addresses for a particular data migration process requested by the user. In FIG. 8, the first data move is depicted. Specifically, the mapping of data to the source has been broken (denoted by dashed lines 810). Rather, the morph container map 806 now points to the temporary container 808 (mapping lines 812). Consequently, the mapping "moves" the data from the source blocks to the temporary container blocks as denoted by lines 814.

Figure 9:
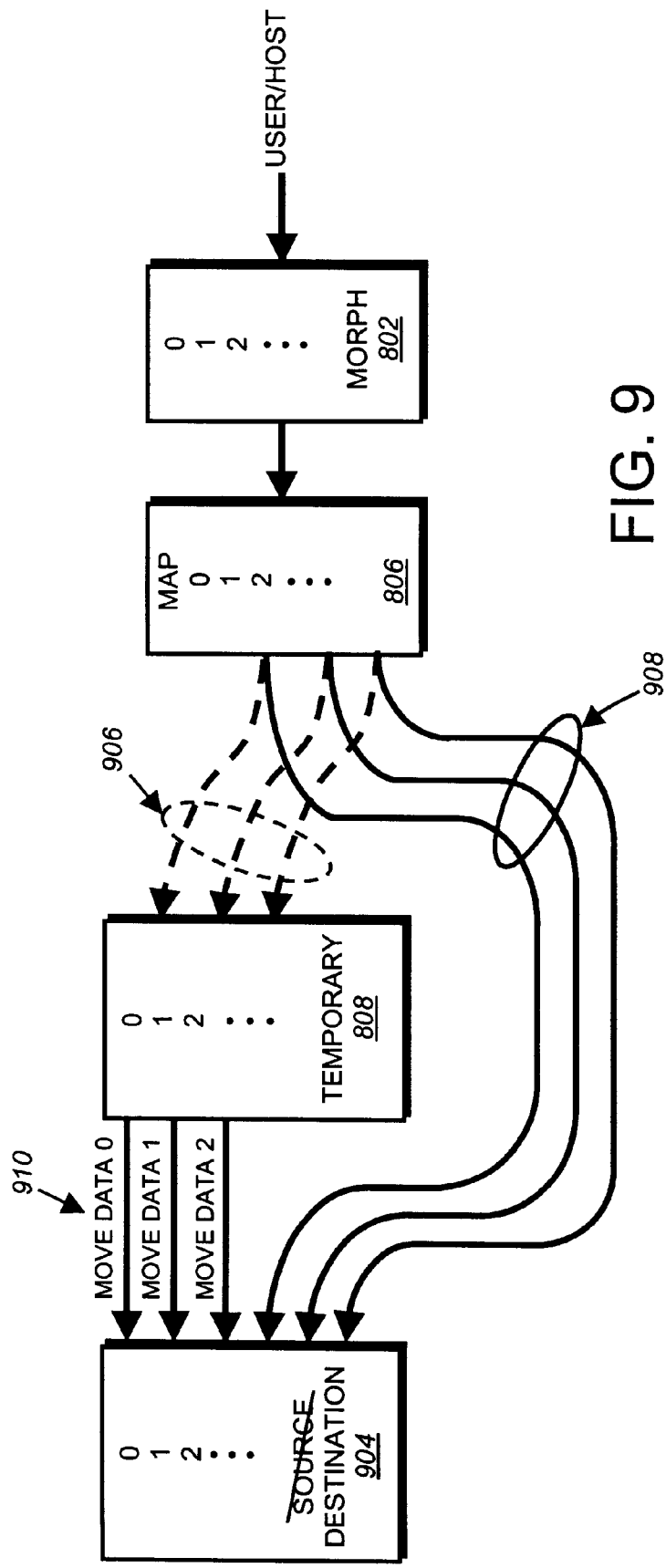
FIG. 9 is a block diagram showing the mapping of a completed data migration from the temporary container to the destination container as begun in accordance with FIG. 8.

FIG. 9 shows the completed data migration. The source container is redesignated as the destination container 904. The mapping to the temporary container 808 has been broken (denoted by dashed lines 906). A new mapping (lines 908) is made from the map 806 to the destination container 904 and associated movement of data occurs as denoted by lines 910.

In practice a physical disk space of approximately one megabyte can be established to support the temporary container of this embodiment. The temporary container is typically arranged to transfer a portion (a block, blocks or other-sized chunk) of the entire data in a given operation. In other words, the movement of data may occur in a number of separate moves, each occurring through the temporary container, in turn.

The foregoing has been a detailed description of a preferred embodiment of the invention. Various modifications and additions can be made without departing from the spirit and scope thereof. For example, while RAID drivers and associated container drivers are shown as part of the adapter firmware, they may reside at a variety of physical locations. The principles described herein may be implemented in hardware, software or a combination of both. In addition, the number of physical disk drives used to implement the teachings described herein is highly variable, and, in fact a single, sufficiently large disk drive can be employed in an alternate embodiment. Accordingly, this description is meant to be taken only by way of example, and not to otherwise limit the scope of the invention.

What is claimed is:

1. A system for changing from a first container structure in a redundant array of independent disk drives (RAID) implementation to a second container structure, each of the first container structure and the second container structure being in communication with a host computer, the system comprising:
   a driver for establishing a higher level container with respect to the first container structure, the higher level container communicating with the host computer and maintaining accessibility to data for the host computer, the higher level container including a mapping structure for mapping data in the first container structure with respect to the second container structure, the second container structure having a different configuration with respect to a configuration of the first container structure, the different configuration including a different RAID level;
   means, in the driver, for designating the first and second container structures as hidden once the higher level container is created, the hidden containers being invisible to and out of communication with the host computer;
   means, in the driver, for moving data from the first container structure to the second container structure based upon a map established in the mapping structure; and
   means, in the driver, for designating the second container structure as visible to the host computer after the moving of data is complete and for deleting the first container structure and the higher level container.

2. The system as set forth in claim 1 wherein the first container structure includes a plurality of containers defining a data stripe.

3. The system as set forth in claim 2 wherein the first container structure includes a predetermined container space and wherein at least some of the second container structure includes the predetermined container space.

4. The system as set forth in claim 3 further comprising a temporary container arranged to receive data from the first container in response to the mapping structure and to transfer the data therefrom into the second container structure in response to the mapping structure.

5. A method for changing from a first container structure in a redundant array of independent disk drives (RAID) implementation to a second container structure, each of the first container structure and the second container structure being in communication with a host computer, the method comprising:
   establishing, with a driver, a higher level container with respect to the first container structure, the higher level container communicating with the host computer and maintaining accessibility to data for the host computer, the higher level container including a mapping structure for mapping data in the first container structure with respect to the second container, the second container structure having a different configuration with respect to a configuration of the first container structure, the different configuration including a different RAID level;
   designating the first and second container structures as hidden once the higher level container is created, the hidden containers being invisible to and out of communication with the host computer;
   moving data from the first container structure to the second container structure based upon a map established in the mapping structure; and
   designating the second container structure as visible to the host computer after the moving of data is complete and for deleting the first container structure and the higher level container.

6. The method as set forth in claim 5 further comprising providing a plurality of containers in the first container structure and defining a data stripe in the first container structure.

7. The method as set forth in claim 6 wherein step of moving includes moving data from a predetermined container space in the first container space into the predetermined container space in the second container structure.

8. The method as set forth in claim 7 further comprising receiving, in a temporary container, data from the first container in response to the mapping structure and transferring the data therefrom into the second container structure in response to the mapping structure.

9. The method as set forth in claim 5 wherein the step of moving includes transferring the data from the first container structure implementing a first level of RAID storage to the second container structure implementing a second level of RAID storage.

10. The method as set forth in claim 5 wherein the second container structure includes at least on additional container therein with respect to the first container structure, thereby defining an on-line container expansion procedure.

* * * * *